March 30, 1954  J. H. MURPHY ET AL  2,673,417
FISHING LURE

Filed March 30, 1949  2 Sheets-Sheet 1

INVENTOR.
John H. Murphy
William R. Anderson
BY Lancaster, Allwine & Rommel
ATTORNEYS.

March 30, 1954   J. H. MURPHY ET AL   2,673,417
FISHING LURE
Filed March 30, 1949   2 Sheets-Sheet 2
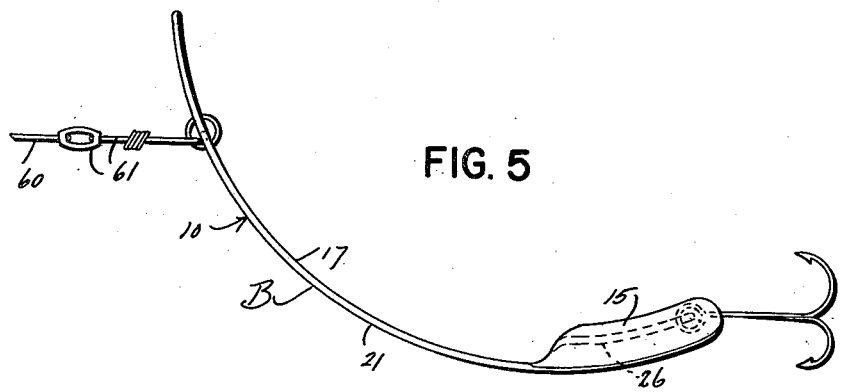
FIG. 5
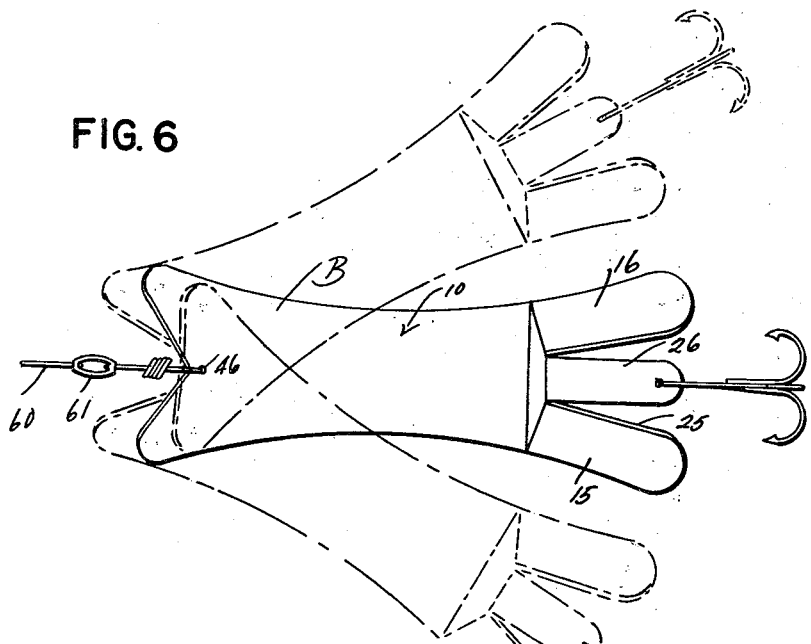
FIG. 6
FIG. 7
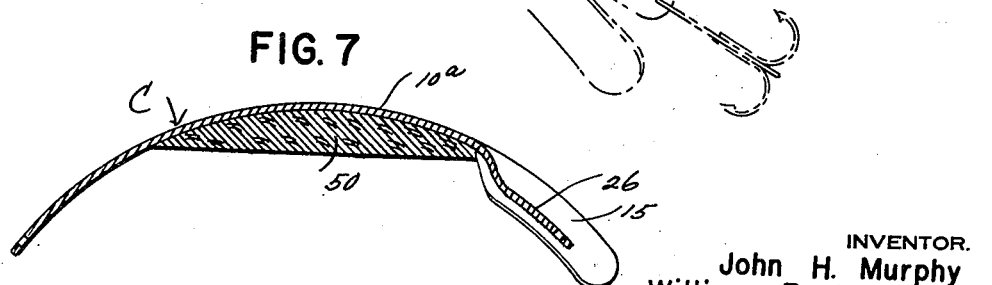
INVENTOR.
John H. Murphy
William R. Anderson
BY
ATTORNEYS.

Patented Mar. 30, 1954

2,673,417

UNITED STATES PATENT OFFICE 2,673,417

FISHING LURE

John H. Murphy and William R. Anderson, Detroit, Mich.

Application March 30, 1949, Serial No. 84,322

5 Claims. (Cl. 43—42.51)

This invention relates to improvements in artificial bait.

The primary object of this invention is the provision of an artificial lure having an improved body structure which will permit of a variety of actions thereof trolling or casting, depending upon the mode of attachment of the line to the lure.

A further object of this invention is the provision of an artificial fish lure having improved means which will permit the lure to rotate in selective directions about its longitudinal axis.

A further object of this invention is the provision of an improved fish lure with means to enable the body to rotate during trolling or casting about a longitudinal axis when the line is connected to one end, and to assume a lateral fluttering or darting action when the line is attached to the other end.

A further object of this invention is the provision of a relatively simple and efficient artificial lure, the parts of which are so constructed that the same may be inexpensively stamped or manufactured.

Other objects and advantages of the invention will be apparent during the course of the following detailed description.

In the accompanying drawings, wherein for the purpose of illustration are shown preferred and modified forms of the lure—

Figure 5 shows a modified type of lure having substantially the same characteristics as the lure of Figures 1 to 4 inclusive, but with the trolling lines connected at the opposite end of the lure.

Figure 6 is a plan view of the lure shown in Figure 5, showing in dot and dash lines the lateral motion of the lure during trolling or casting.

Figure 7 is a further modified form of the lure showing it as a "float" type.

Figure 1:
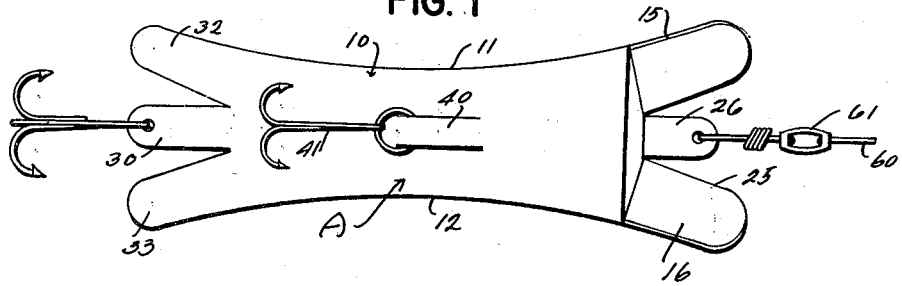
Figure 1 is a plan view of the lure showing line and hook attachments.

In the drawings, wherein similar reference characters designate corresponding parts thruout the several views, the letter A may generally designate the lure shown in Figures 1 to 4 inclusive; B the lure shown in Figures 5 and 6, and C the lure shown in Figure 7. All of these forms of the artificial lure have the same novel charactertistics and insofar as that is true, the same reference characters have been applied to these three forms.

The improved lure structure A comprises an elongated body portion 10 of concavo-convex longitudinal cross section. Preferably the body portion has a sheet-like appearance and indeed may be made of sheet metal, such as steel, brass, copper, aluminum and the like, altho it is contemplated to construct the same of plastic, wood, cork, rubber or composition material. The material is of relatively thin gauge, altho this may vary with the size of the lure. Preferably, the body portion is of straight line transverse cross section, and not cupped altho it is contemplated that it may be of channel shaped cross section. The body portion 10 preferably has concaved side edges 11 and 12 (see Fig. 1). They may taper from the intermediate portion of the body in divergent relation towards both ends of the body, as shown in Figure 1.

Figure 3:
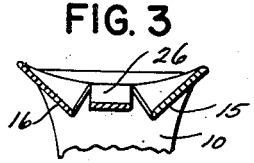
Figure 3 is a cross sectional view taken substantially on the line 3—3 of Figure 4.
Figure 4:
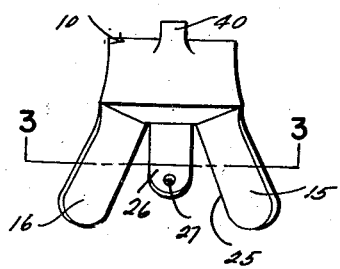
Figure 4 is a front end elevation of the lure.

At one end of the body 10 is provided with a novel vane or wing construction consisting of a pair of wings, blades or vanes 15 and 16 which extend below the extended line of the normal under or concaved surface 17 of the body and are laterally out-turned, as shown in Figure 3, so as to assume a relative divergence in the direction of the normal upper or convex surface 21 of the body. The angle of these vanes is important in relation to the size of the body portion 10, and the radius of the body portion 10 is also important in relation to the size of the lure. The vanes 15 and 16 also diverge endwise with respect to each other at opposite sides of the longitudinal axis of the lure. The vanes are flat, elongated and finger-like and relatively spaced to provide a V-shaped space 25. A line attaching finger or projection 26 may be formed integral with the body 10 in this space 25 and extending endwise; preferably not being as long as the vanes 15 and 16; the same having an opening 27 for the selective attachment of a line or a hook or swivel thereto.

It will be noted that the vanes 15 and 16 bodily project below the concaved side of the body portion and the outer side surfaces of the vanes 15 and 16 face laterally.

At the opposite end the body 10 is provided with a line attaching finger or projection 30 which may be apertured for securement of a line, hook or swivel thereto. Preferably at each side of this projection 30 are stabilizing fingers 32 and 33 which may relatively diverge endwise. They are not angled to provide for lure deflection, but lie in the same general concavo-convex contour as the rest of the body portion 10.

Figure 2:
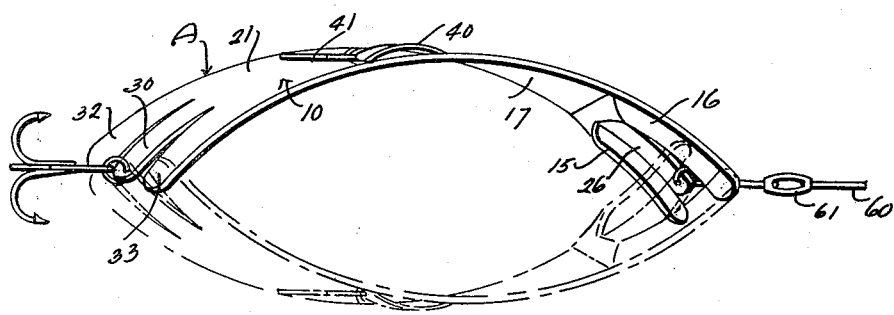
Figure 2 is a perspective view of the lure, showing line and hook attachment and in dot and dash lines showing the spinning action of the lure about its longitudinal axis.

The attachment of hooks is selective, and as shown in Figures 1 and 2 a hook attaching loop 40 may be struck from the body or material of the body for the securement of a top hook 41 thereto. Likewise as shown in the form of invention B, the line attaching finger projection may be omitted and an opening 46 formed in the body for attachment of the line or hook thereto.

In the form of invention C the characteristics of the vane structure above described for the form of invention A, are provided as a part thereof, but the lure C on the concave side of the body portion 10ᵃ thereof may be provided with some buoyant material 50, such as cork, etc. for supporting the lure as a floating type.

The hooks may also be attached to the concave or under side of the lure, if so desired, or laterally upon the lure (not shown).

Referring to line connection of the lure and its operation; assuming it is intended to use it as a rotary or spinning type, the line 60 is attached by swivel 61 to the finger 26 and hooks are attached as desired to the body portion 10 at the rear end or intermediate portion in any selected arrangement. If the lure is pulled with the line directly along the longitudinal axis of the body portion 10, the downwardly and inwardly sloping vanes 15 and 16 will have a tendency to cause the lure to dive. It is vertically impossible to maintain the line along the longitudinal axis, as will be quite obvious to those skilled in the art, and therefore any slight angular pulling action of the line will cause a greater surface of one of the vanes to be exposed to water resistance than the other, and this will cause the lure to rotate substantially about its longitudinal axis as shown in dot and dash lines in Figure 2. Angular change in direction of the lure will cause rotation of the lure in an opposite direction. It is obvious that the lure rotates in either direction and actually this takes place during trolling unless the line pull is entirely from one side of the longitudinal axis of the lure such as would normally happen during turning of a boat, if trolling or casting is being done from a boat.

With the line attached to the opposite end of the lure, as shown in the form of invention B in Figures 5 and 6, the lure normally assumes a position with the concaved surface of the body portion upward and the vane end of the lure slightly below the connecting end of the line. Under these circumstances the vanes will cause a fluttering or darting action of the lure laterally and alternately at each of the longitudinal axes of the lure, in simulation of the action designated by dot and dash lines in Figure 6 of the drawing.

More than two of the angled vanes may be provided at the lure end, if so desired.

Various changes in the shape, size and arrangement of parts may be made to the form of the invention herein shown and described without departing from the spirit of the invention or the scope of the claims.

We claim:

1. As an article of manufacture a fishing lure comprising an elongated thin gauged body portion of least width intermediate the ends thereof and therefrom increasing in width towards each of the ends thereof, said body portion at one end thereof having a pair of fingers which are divergent longitudinally of the body portion, each of said fingers at the outer side edges conforming to the contour of the body portion side edges, said body portion at the opposite end from said fingers having a pair of vanes which extend in relative divergence longitudinally at opposite sides of the longitudinal center line extending along the surface of the body portion, said last mentioned vanes at the remote side edges thereof being in general flush alignment with the side edges of the body portion to which said vanes are attached, and a float connected to one surface of the body portion at a location entirely between the said divergent fingers and the said divergent vanes.

2. In a fishing lure, an elongated body portion of thin gaged material shaped in concavo-convex fashion to provide an upper convex surface and a lower concave surface longitudinally, said body portion at one end thereof having a pair of relatively spaced blades extending in relative divergence endwise of the lure and laterally inclined in relative divergence so that the blades are divergent from the concave side of the body portion in the direction of the convex side thereof, said body portion between said blades having an endwise extending finger, the other end of the body portion being provided with a pair of endwise extending fingers which are relatively divergent endwise and lie along the same general contoured surface as the body portion, said last mentioned end of the body portion having an endwise extending finger between the aforesaid fingers.

3. A fishing lure comprising an elongated body of thin gauged material longitudinally concavo-convexed with one extreme end of the body having a pair of divergently extending deflecting blades, the planes of divergence of which are in the direction of the convexed side of the body, said body at its opposite end having a pair of endwise extending fingers lying in substantially the same contour as the adjacent portion of the body, the side edges of said body being concaved unbrokenly from end to end with the outer side edges of the blades and fingers lying flush with the adjacent side edges of said body.

4. A fishing lure comprising an elongated body having means thereon for the attachment of hooks and lines, said body at each of its ends having a plurality of endwise extending vanes, the vanes at one end being relatively inclined in divergent planes from one surface of the body in the direction of the opposite surface thereof, said divergent vanes being also arranged divergent endwise beyond the body, said body at its opposite end having the plurality of vanes extending endwise in divergent relation and lying substantially flush with the contour of the adjacent portion of the body.

5. A fishing lure comprising an elongated body which is longitudinally concavo-convexed and has one extreme end thereof provided with two fixed deflecting blades which are divergently inclined with respect to each other in the direction from the concave surface of the body towards the convex surface thereof, said deflecting blades being also divergently inclined endwise of the body, and the body at the opposite end thereof having a pair of fingers endwise extending in divergent relation and lying in the same general contour as the adjacent portion of the body.

JOHN H. MURPHY.
WILLIAM R. ANDERSON.

References Cited in the file of this patent

UNITED STATES PATENTS

| Number | Name | Date |
|---|---|---|
| 962,237 | Murry | June 21, 1910 |
| 1,332,112 | Duhamel | Feb. 24, 1920 |
| 1,575,139 | Wiesenfeld | Mar. 2, 1926 |
| 1,738,617 | Scharrer | Dec. 10, 1929 |
| 1,866,465 | Harrington et al. | July 5, 1932 |
| 2,053,954 | Marsh | Sept. 8, 1936 |
| 2,183,849 | Swanberg | Dec. 19, 1939 |
| 2,238,604 | Sabin | Apr. 15, 1941 |
| 2,481,710 | Arndt | Sept. 13, 1949 |

FOREIGN PATENTS

| Number | Country | Date |
|---|---|---|
| 5,082 | Great Britain | Feb. 28, 1902 |
| 46,018 | Denmark | Aug. 1, 1932 |